Dec. 14, 1937.   C. A. NESSETH   2,102,432
COMBINATION TRUCK AND CONVEYER
Filed June 5, 1935   2 Sheets-Sheet 1
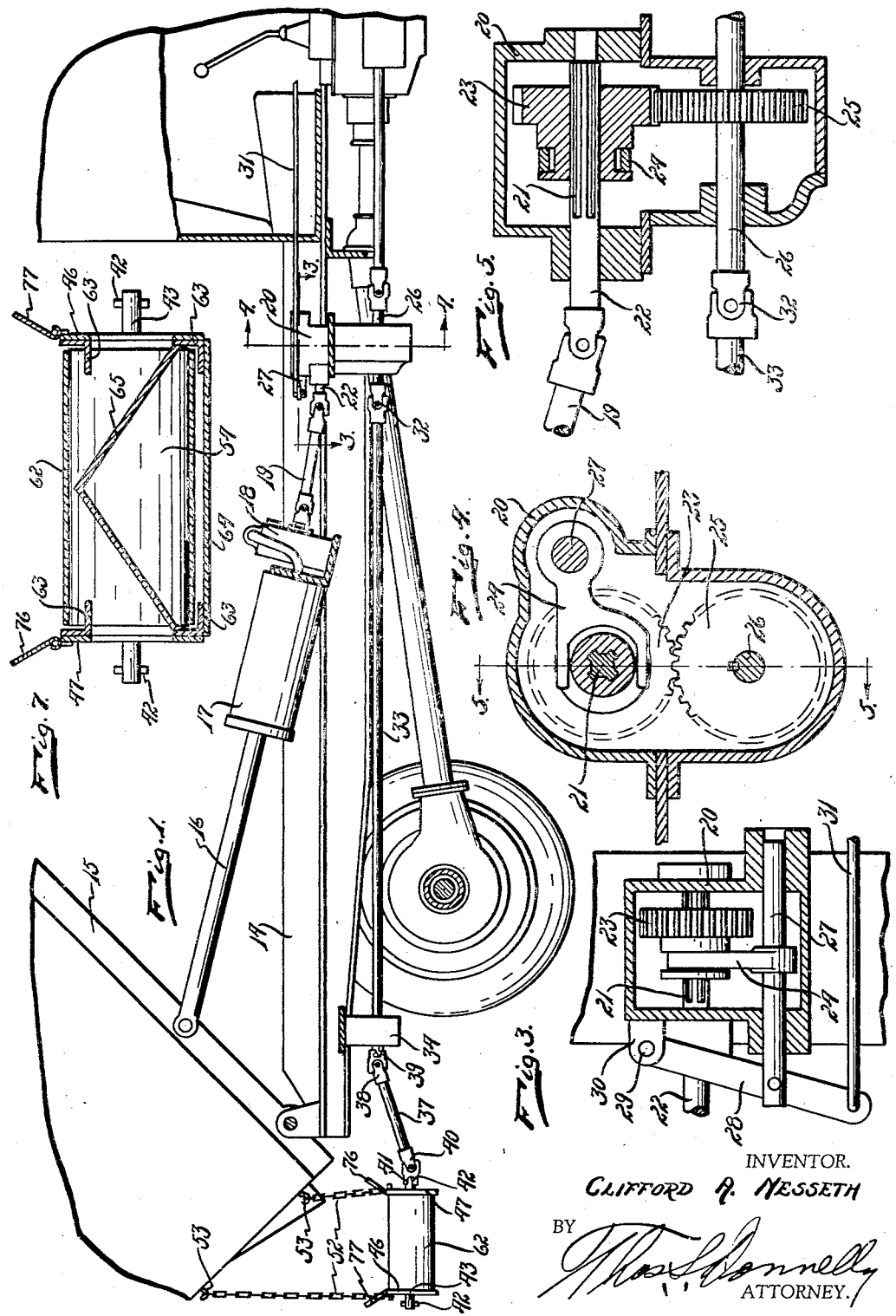
INVENTOR.
CLIFFORD A. NESSETH
BY
ATTORNEY.

Dec. 14, 1937.   C. A. NESSETH   2,102,432
COMBINATION TRUCK AND CONVEYER
Filed June 5, 1935   2 Sheets-Sheet 2
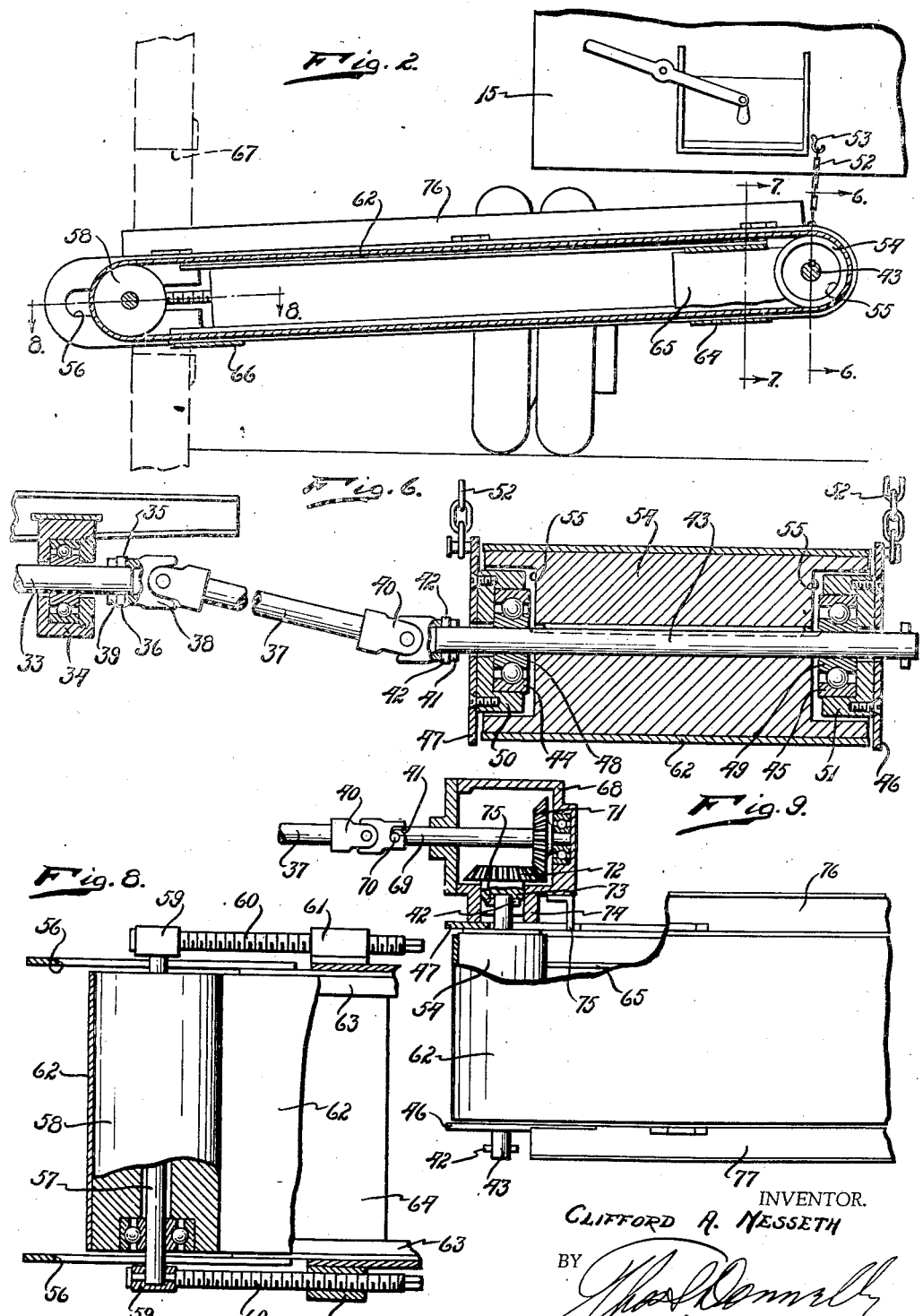
INVENTOR.
CLIFFORD A. NESSETH
BY
ATTORNEY.

Patented Dec. 14, 1937

2,102,432

UNITED STATES PATENT OFFICE 2,102,432

COMBINATION TRUCK AND CONVEYER

Clifford A. Nesseth, Detroit, Mich.

Application June 5, 1935, Serial No. 25,022

3 Claims. (Cl. 214—83)

My invention relates to a new and useful improvement in a combination truck and conveyer although from the description of the invention it will appear obvious that there are certain features of the invention which may be used independently of the combination with a truck or similar vehicle. It is an object of the present invention to provide a means for conveying material which is poured or dumped from a truck to a distant point, within certain limits. As now commonly practised in dumping sand, gravel, coal and other loose material, and especially coal, it is often necessary to dump the contents of the vehicle in a pile and then shovel the pile of material into a container or through an opening. In the invention I have provided a conveyer which will serve to receive the material as it is dumped from the truck and convey it to a distant point or through an opening into a container, even though this opening through which the material is to be passed is elevated.

It is another object of the invention to provide a device of this class which will be simple in structure, economical of manufacture, durable and highly efficient in use.

Another object of the invention is the provision of a device which may be easily and quickly attached in position for operation and removed therefrom so that the driver of the vehicle will be required to spend but little time in making the necessary adjustment for the invention.

Another object of the invention is the provision of a device of this kind which will require a minimum alteration in trucks or similar vehicles of standard manufacture.

Another object of the invention is the provision of a conveyer of this class which may be used for conveying the material from the rear of the vehicle and at various angles thereto.

Other objects will appear hereinafter.

The invention consists in the combination and arrangement of parts hereinafter described and claimed.

The invention will be best understood by a reference to the accompanying drawings which form a part of this specification, and in which, Fig. 1 is a fragmentary, central, sectional view of a truck showing the invention applied thereto and illustrated in side elevation.

Fig. 2 is a longitudinal, vertical, sectional view of the conveyer showing it applied.

Fig. 3 is a fragmentary sectional view taken on line 3—3 of Fig. 1.

Fig. 4 is a sectional view taken on line 4—4 of Fig. 1.

Fig. 5 is a sectional view taken on line 5—5 of Fig. 4.

Fig. 6 is a sectional view taken on line 6—6 of Fig. 2.

Fig. 7 is a sectional view taken on line 7—7 of Fig. 2.

Fig. 8 is a fragmentary, sectional view taken on line 8—8 of Fig. 2.

Fig. 9 is a fragmentary, top plan view of a part of the invention showing an attachment thereto in central, horizontal cross section.

In the drawings I have illustrated the invention used with a vehicle having a chassis 14 on which is swingably mounted at the rear end a body 15. This body is shown in fragment in Fig. 1 in elevated position. It is moved to elevated position by means of the piston rod 16 which projects from the cylinder 17 which is supplied with air from the pump 18 operated by the shaft 19 which connects to the gear box 20. In this gear box 20 is slidably mounted on the splined portion 21 of the shaft 22 a gear 23 which may be slid by means of the yoke 24 into mesh and out of mesh with the gear 25 which is fixedly mounted on the power take-off shaft 26. This yoke 24 is fixedly mounted on the shaft 27 which is pivotally connected to the lever 28, intermediate its ends. One end of the lever 28 is pivotally connected by means of the pin 29 to the lug 30 which extends outwardly from the housing 20. The other end of the lever 28 is connected to the operating rod 31 which extends to a position accessible to the driver of the vehicle. The power take-off and the means of rotating the shaft 22 together with the control therefor, is of standard construction and forms no part of the present invention.

Connected by the universal joint 32 to the shaft 26 is a rearwardly extended shaft 33 which extends through and is journaled in the bearing 34. Projecting outwardly from opposite sides of the shaft 33 beyond the bearing 34 are trunnions or studs 35 and 36. A connecting shaft 37 is provided having a universal fitting 38 at one end and provided at diametrically opposite points with the bayonet slots 39 which are adapted to receive and lock on to the trunnions 35 and 36. The opposite end of the connecting shaft 37 is also provided with a universal fitting 40 having bayonet slots 41 at diametrically opposite sides for reception of the studs or trunnions 42 which project radially outwardly from the roller-driving shaft 43. The shaft 43 is journalled in the bearings 44 and 45 which are secured to the side walls 46 and 47 which form a part of the supporting frame. The shaft 43 is fixed to the collars 48 and 49 which form a part of the bearings 44 and 45, respectively. This is preferably effected by a press fit. The bearings are supported in the housings 50 and 51 which are secured to the side walls 46 and 47 so that a spreading of these side walls is prevented as the bearings cannot move longitudinally of the shaft 43. Each of the side walls 46 and 47 carries supporting chains 52 which may be secured to hooks 53 carried by the body 15 so as to retain the rear end of the conveyer in the proper position for operation. It is obvious that when the connecting shaft 37 is connected in position as shown in Fig. 6 or Fig. 1, a rotation of the shaft 33 will effect a rotation of the shaft 43.

Fixedly mounted on the shaft 43 is a roller 54 which is cut away at 55 at its opposite ends to accommodate the bearings.

The shaft 43 extends through the side walls 46 and 47 at one end and in each of these side walls at the opposite end is formed an elongated slot 56 through which extends a shaft 57 on which is rotatably mounted the roller 58. The shaft 57 as shown in Fig. 8 projects beyond the outer face of the side walls 46 and 47 and is provided with a head 59 which serves as a swivel for one end of the screw 60. This screw projects through a nut 61 which is fixedly mounted on the side wall so that by rotating the screw 60 the roller 58 may be moved toward and away from the roller 54 so as to retain in taut condition the endless belt 62 which passes around these rollers and travels between the side walls 46 and 47.

Secured to the inner face of each of the side walls at the upper and lower edges thereof, is an angle iron 63 which extends the length of the wall and serves as a guide for the conveyer belt 62. These angle irons are connected at the rear end of the conveyer by a transversely extended plate 64 and located above this plate is the triangular-shaped reinforcing brace 65. A plate 66 similar to plate 64 connects the lower set of angle irons at the forward end of the conveyer and serves as a rest for the conveyer belt. These plates 64, in addition to connecting the opposite walls in fixed relation and reinforcing the structure, also serve as a support for the belt to prevent its sagging. The angle irons 63 also prevent the sagging of the belt when traveling.

As shown in Fig. 1 when the device is connected as illustrated in Fig. 2 the conveyer may be extended laterally at right angles to the vehicle or truck or it may be extended at an inclination to the longitudinal axis of the truck on account of the swinging which is permitted through the universal connections indicated. It is obvious that the free end of the conveyer may be elevated to any desired height within its own limits so that it may be projected through an opening 67 of a building or other similar structure into which it is desired to convey the material from the truck.

In Fig. 9 I have shown an attachment which permits the use of the conveyer when extended outwardly parallel to the length of the truck. This attachment comprises a housing 68 projecting outwardly from which is a shaft 69 having outwardly extending trunnions 70 for engaging in the bayonet slot 41 of the universal fitting 40. Fixedly mounted on the shaft 69 within the housing 68 is a bevel gear 71 adapted to mesh with the bevel gear 72 having the neck 73 engaging in the sleeve 74. This neck is provided with the diametrical slot 75 in which may engage the trunnions 42 carried on the end of the shaft 43. An angle iron 75 is mounted on the housing 68 and adapted to abut against the side wall 47.

Side boards 76 and 77 are swingably mounted on the upper end of each of the side walls 46 and 47 to provide a guide for the material which is being conveyed on the endless belt 62. It is obvious that by shifting the gear 23 into one position or the other the shaft 19 may be caused to rotate so that control of the operation of the pump is provided.

It is believed obvious that the device may be very easily and quickly mounted in position for use and removed therefrom. It is of such a construction that it is sufficiently light for a single operator to place the conveyer on the truck when not in use so that it may be conveyed from place to place with the load which is to be delivered.

While I have illustrated and described the preferred form of my invention, I do not wish to limit myself to the precise details of structure shown but desire to avail myself of such modifications and variations as may come within the scope of the appended claims.

Having thus described my invention, what I claim as new and desire to secure by Letters Patent is:

1. In a device of the class described, a conveyer comprising: a pair of spaced, oppositely disposed side plates; an angle iron mounted on the inner face of each of said side plates, adjacent the upper and lower edges thereof, and extending longitudinally thereof; a transversely extending plate connecting said side plates at their opposite ends, said transversely extending side plate being positioned below and spaced from the lower of said angle irons; a roller rotatably mounted between said side plates at each end thereof, said rollers being located to position the periphery thereof above the upper of said angle irons and above the lower of said angle irons; and an endless belt passing around said rollers, the upper portion of said belt passing above the upper of said angle irons and the lower portion of said belt passing above the lower of said angle irons, said transversely extending plates assisting the lower of said angle irons in preventing sagging of the lower portion of said endless belt.

2. In combination with a truck having a chassis and a rotatable power take-off shaft, a rearwardly extending shaft extending rearwardly of said power take-off shaft and positioned below said chassis; a bearing mounted on and depending from said chassis adjacent its rear end, said rearwardly projecting shaft projecting through and being journaled in said bearing; means for rotating said rearwardly extending shaft upon the rotation of said power take-off shaft; a conveyer having a roller at its opposite ends; a shaft projecting outwardly centrally from the end of one of said rollers and adapted upon rotation for rotating said roller; a flexible shaft connection for directly connecting the projecting end of said roller shaft to the rear end of said rearwardly extending shaft; and an endless belt embracing said rollers and driven by the rotating roller.

3. In combination with a truck having a chassis and a rotatable power take-off shaft, a rearwardly extending shaft extending rearwardly of said power take-off shaft and positioned below said chassis; a bearing mounted on and depending from said chassis adjacent its rear end, said rearwardly projecting shaft projecting through and being journaled in said bearing; means for rotating said rearwardly extending shaft upon the rotation of said power take-off shaft; a conveyer having a roller at its opposite ends; a shaft projecting outwardly centrally from the end of one of said rollers and adapted upon rotation for rotating said roller; a flexible shaft connection for directly connecting the projecting end of said roller shaft to the rear end of said rearwardly extending shaft; and an endless belt embracing said rollers and driven by the rotating roller, there being means for effecting the detachable connection of said flexible shaft connection at said rearwardly extending shaft and said roller shaft.

CLIFFORD A. NESSETH.